May 21, 1957

A. J. BRYANT 2,792,858

POWER TRAIN FOR TILT ARBOR SAW

Filed Jan. 27, 1956

Albert J. Bryant
INVENTOR.

BY
*Attorneys*

Albert J. Bryant
INVENTOR.

United States Patent Office 2,792,858
Patented May 21, 1957

2,792,858
POWER TRAIN FOR TILT ARBOR SAW

Albert J. Bryant, Rosemead, Calif.

Application January 27, 1956, Serial No. 561,797

4 Claims. (Cl. 143—36)

This invention relates generally to power tools and is more particularly concerned with a power saw conversion attachment for power tools which incorporate a horizontal arbor overlying relatively parallel ways, such tools being of the character identified as the "Shopsmith" woodworking tool.

The primary object of the invention is to provide a power saw conversion attachment for power tools of the character set forth which provides a tilting saw blade assembly adjustable relative to a saw table whereby angle cutting is done accurately and expeditiously.

A further object of the invention in conformance with that set forth above is to provide a support frame in a power saw conversion attachment which is securable on the power tool in driving relationship to the tool arbor, said support frame including plural power transmitting means for driving a power saw shaft carried on an auxiliary frame adjustably mounted on a horizontal pivot axis on the support frame.

Another object of the invention in conformance with that set forth above is to provide a power saw conversion attachment of the character set forth which is readily and economically manufactured, easily installed and used, and practical and acceptable for the purpose intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
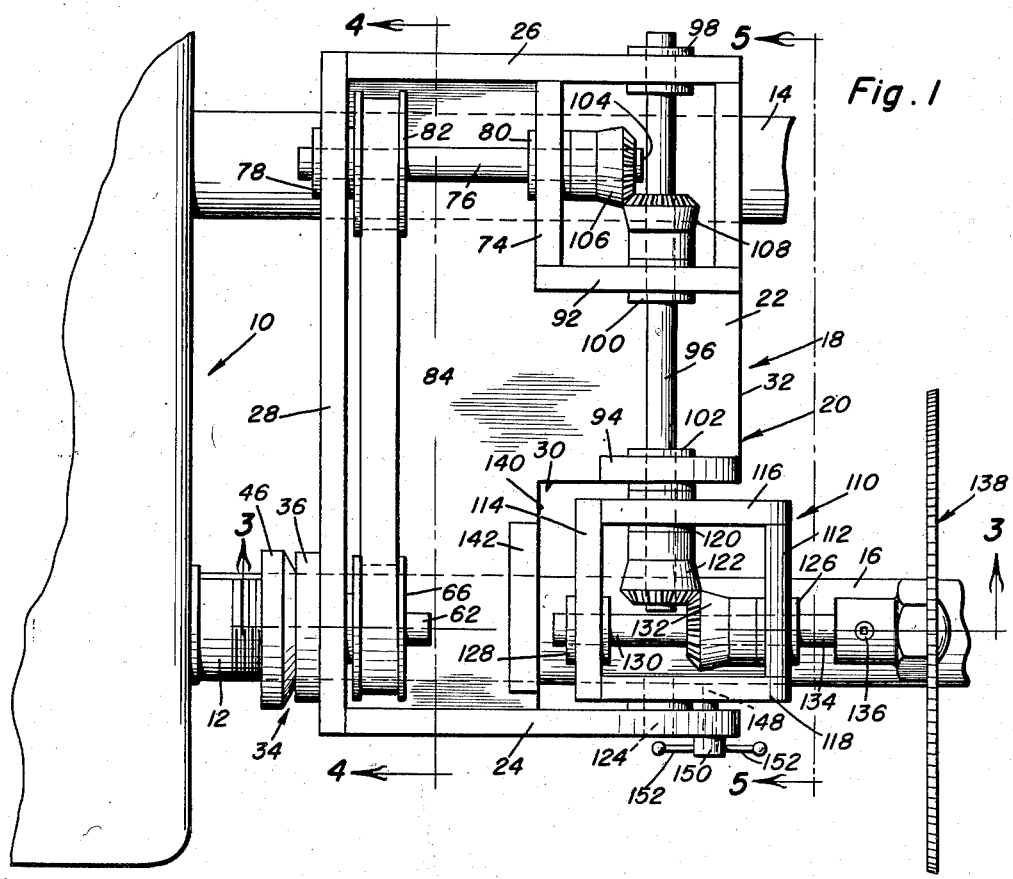
Figure 1 is a top plan view of the novel power saw conversion attachment in position on a power tool, showing a fragmentary portion of the power tool including a rotary arbor and the ways thereof.

Indicated generally at 10 is a fragmentary portion of the power tool, such as the "Shopsmith" type, which includes a rotary arbor 12, said arbor 12 overlying in parallel relationship a pair of horizontally disposed way elements 14 and 16.

The power saw conversion attachment is indicated generally at 18 and includes a support frame 20 incorporating a bottom portion 22, said bottom portion 22 having suitably secured thereon vertically extending side walls 24 and 26 connected to a vertically extending back wall member 28, the bottom member 22 also including a notched out portion 30 extending in one side of the forward edge 32 of said bottom.

The arbor 12 may incorporate any conventional means for securing a shaft therein, said means indicated generally at 34 and comprising an internally threaded ring element 36 which may be secured to the back wall 28 in alignment with a suitably apertured portion 38, being retained thereon by means of suitable fastening screws, such as the machine screws 40. The arbor 12 has the ring 36 secured on a reduced diameter threaded portion 42 and may be externally threaded at 44 to accommodate a clamp ring 46 thereon for locking the arbor 12 relative to the ring 36. The arbor 12 incorporates therein an internal rotary portion 48 including a tapered blind bore 58 for accommodating therein a similarly tapered portion 60 of a first or stub shaft member 62.

The stub shaft or first shaft member 62 is journaled in a suitable bearing element 64 secured in any suitable manner in the apertured portion 38 of the back wall 28 and includes on its opposite end a suitably keyed drive pulley element 66.

The bottom portion 22 is maintained in relatively parallel relationship to the ways 14 and 16 by means of suitable vertically extending support elements 68 (only one being shown) that may incorporate a lower transverse portion 70 having arcuate undersurfaces 72 conforming to the configuration of the ways 14 and 16.

The support frame 20 incorporates a vertically extending wall portion 74 extending upwardly from the bottom portion 22 in spaced parallel relationship to the back wall 28, and a second support shaft 76 is journaled in suitable bearing elements 78 and 80 in the walls 28 and 74, respectively. The shaft 76 has suitably keyed on an intermediate portion thereof a pulley member 82 which is in coplanar relationship with the pulley member 66, a suitable drive belt 84 being journaled over the respective pulley members providing a power transmission means between the first shaft 62 and the second shaft 76.

Figure 4:
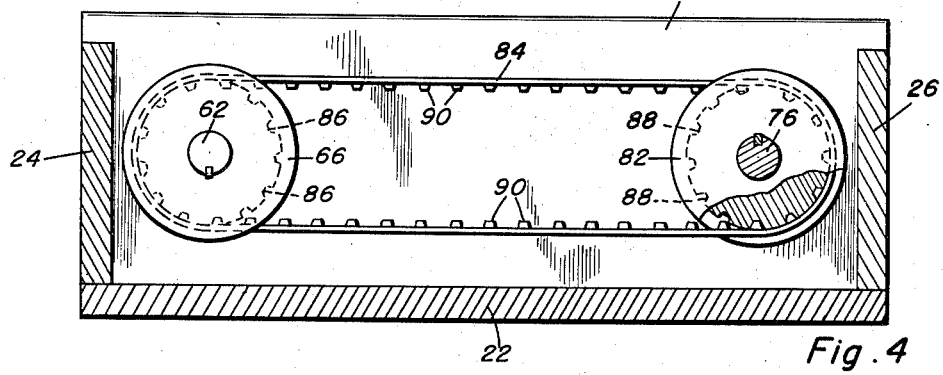
Figure 4 is a sectional view taken substantially on line 4—4 of Figure 1.
Figure 5:
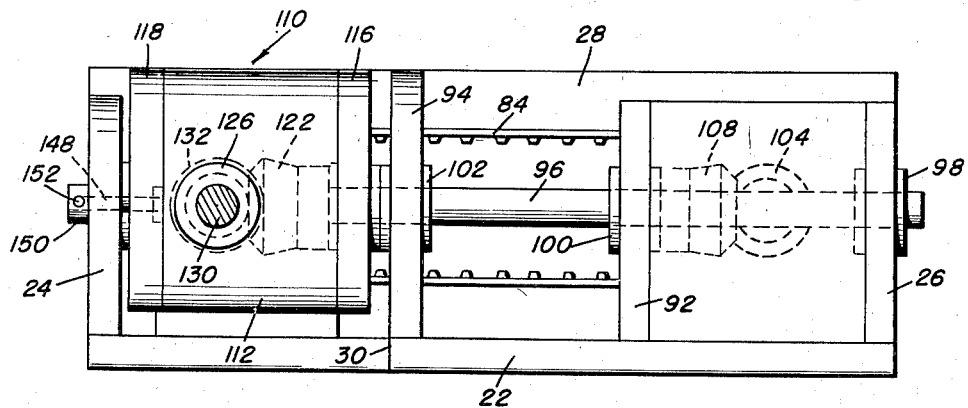
Figure 5 is a sectional view taken substantially on line 5—5 of Figure 1.

As seen in Figure 4, the pulley members 66 and 82 may incorporate peripheral notches 86 and 88, respectively, and the belt 84 may include inwardly directed lug portions 90 engaged in the previously mentioned notches providing a positive drive relationship between said pulleys and eliminating the necessity of a belt tightener.

As seen in Figure 1, the frame member has extending upwardly from the bottom 22 a wall portion 92 which may be suitably secured to the end of the wall 74, and there is also included an additional wall portion 94 disposed in parallel relationship to the wall 92, said walls 92 and 94 being mutually parallel and also disposed in a parallel relationship to the end wall 26. A third support shaft 96 extends transversely through the walls 26, 92 and 94, being supported therein by means of suitable bearing elements 98, 100 and 102, respectively. The shaft 76 has secured on the end portion 104 thereof a bevel gear element 106 which is interengaged with a cooperating bevel gear element 108 suitably secured on an intermediate portion of the third support shaft 96 which is disposed in a transverse or normal relationship to the shaft 76. As can be seen, power transmitted from the shaft 62 will result in rotating the shaft 76 and involve the further rotation of the shaft 96.

An auxiliary support frame is indicated generally at 110 and incorporates mutually parallel front and rear wall portions 112 and 114 which are suitably secured to right angularly related side walls 116 and 118. The auxiliary support frame 110 has the side wall 116 thereof suitably apertured to accommodate a bearing element 120 through which an intermediate portion of the third shaft 96 extends, said shaft being journaled therein and including on an end portion extending within the auxiliary support frame a bevel gear element 122 which is suitably secured thereon. The side wall 118 of the auxiliary support frame is suitably apertured and pivotally supported from a stub shaft element 124 which is carried on the side wall 24 in axial alignment with the shaft 96. The front and rear walls 112 and 114, respectively, incorporate suitable bearing elements 126 and 128, respectively, which are in axial alignment and support therein a power saw drive shaft member 130 which has suitably secured on an intermediate portion thereof a bevel gear element 132 which is interengaged with the bevel gear element 122. Thus, the shaft 96 will drive the shaft 130 through the interengagement of the bevel gear elements 122 and 132, respectively, and will permit the auxiliary support frame 110 to be pivoted about a horizontal pivot axis defined by the shaft 96.

The shaft 130 has a forwardly extending end portion 134 which has suitably secured thereon by means of a setscrew 136 a conventional power saw blade assembly indicated generally at 138.

Figure 3:
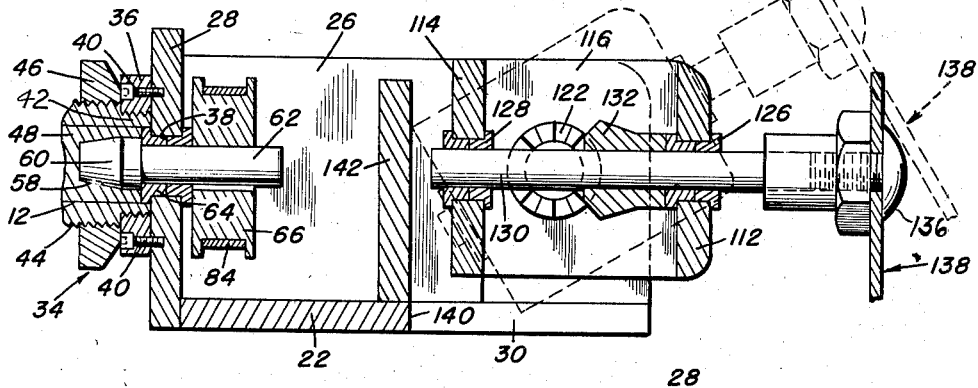
Figure 3 is a sectional view taken substantially on line 3—3 of Figure 1.

The bottom member 22 of the support frame 20 may have suitably secured thereon in vertically extending relationship between the rear wall 28 and the forward edge 140 of the notched out portion 30 in the bottom a stop or abutment plate 142 which may engage the back or rear wall 114 of the auxiliary support frame, see Figure 3, and may conveniently define a given angular relationship of the power saw blade assembly 38, for example, engagement with the stop plate 142 may define a 45° angle of the power saw blade. The abutment plate 142 may be moved in closer relationship to the rear wall 28, thus permitting a greater range of pivotal movement of the auxiliary support frame.

Figure 2:
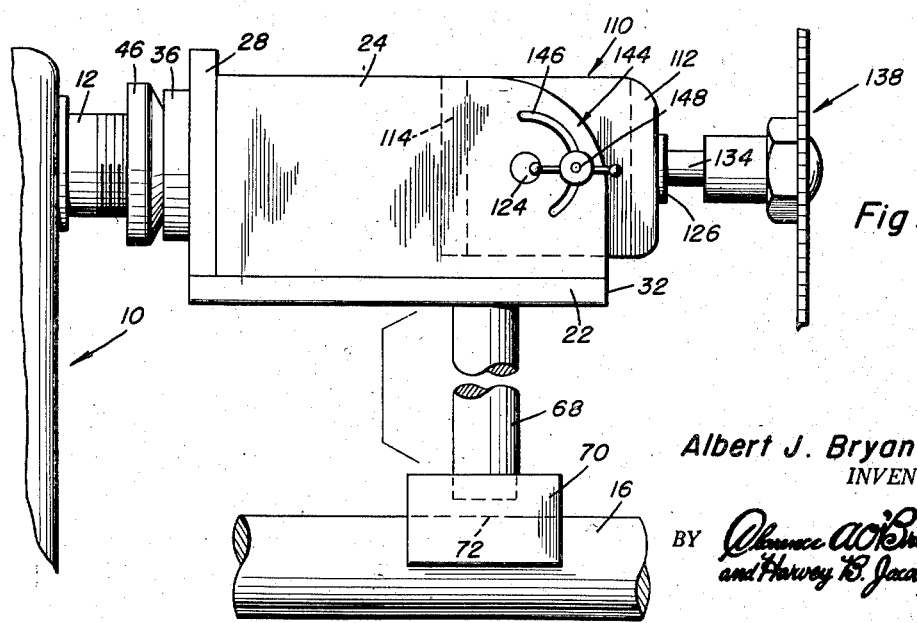
Figure 2 is a side elevational view of the novel power saw attachment looking from the nearest side of Figure 1.

Means are provided for retaining the auxiliary support frame 110 in various positions of adjusted angular relationship relative to the support frame 20, as seen in Figure 2, said means being indicated generally at 144 and comprising an arcuate slot portion 146 extending through the side wall 24 of the support frame, said arcuate portion 146 being disposed in concentric relationship relative to the pivotal support shaft 124, and a threaded stud element 148 is suitably secured in the side wall 18 of the auxiliary support frame and extends through said slot portion 146, said stud element 148 having secured on the end thereof a clamp nut element 150 through which extend transverse handle portions 152 for the purpose of readily loosening of said clamp nut and permitting ready adjustment of the auxiliary support frame.

Various positional directional terms such as "front," "rear," etc. are utilized herein to have only a relative connotation to aid in describing the device, and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power saw conversion attachment for use with power tools including a horizontally disposed rotary arbor extending in overlying parallel relationship to horizontal ways comprising a support frame, means on said frame for securing said frame on the power tool, a first shaft member journaled on said frame and including means on one end portion for detachably securing the shaft member in driving relationship to the rotary arbor, a second shaft member journaled on said frame in spaced parallel relationship from the first shaft member, power transmission means secured between the first and second shaft members, a third shaft member journaled on said frame in transverse relationship to the second shaft member, power transmission means extending between the second and third shaft members, an auxiliary frame journaled on the support frame on a horizontal pivot axis in alignment with the third shaft member, a power saw drive shaft member journaled on the auxiliary frame normal to the horizontal pivot axis thereof, power transmission means extending between the third shaft member and the power saw drive shaft member, means on the power saw shaft for detachably securing a power saw blade thereon, and adjustable securing means extending between the support and auxiliary frame for retaining the auxiliary frame in angular adjustment about the horizontal pivot axis thereof.

2. A power saw conversion attachment as set forth in claim 1 wherein the power transmission means between the second and third shaft members, and third and drive shaft members comprise spaced bevel gear drive assemblies permitting rotation of the third shaft member and horizontal pivotal adjustment of the auxiliary frame about its horizontal pivot axis.

3. A power saw conversion attachment as set forth in claim 1 wherein the power transmission means between the second and third shaft members, and third and drive shaft members comprise spaced bevel gear drive assemblies permitting rotation of the third shaft member and horizontal pivotal adjustment of the auxiliary frame about its horizontal pivot axis, wherein the adjustable securing means comprises an arcuate slot portion on the support frame in concentric relationship relative to the horizontal pivot axis of the auxiliary frame, a stud element extending laterally from the auxiliary frame and through the slot portion of the support frame, and clamp means on said stud element engageable with an outer surface portion of the support frame.

4. A power saw conversion attachment as set forth in claim 1 wherein the power transmission means between the second and third shaft members, and third and drive shaft members comprise spaced bevel gear drive assemblies permitting rotation of the third shaft member and horizontal pivotal adjustment of the auxiliary frame about its horizontal pivot axis, wherein the power transmission means between the first and second shaft members comprises a pair of aligned pulley members secured on the respective shaft members in planar alignment, and a flexible belt element is journaled over said pulley members for providing a driving relationship therebetween.

References Cited in the file of this patent
UNITED STATES PATENTS

| | | |
|---|---|---|
| 2,050,497 | McCollum | Aug. 11, 1936 |
| 2,412,704 | Jaques | Dec. 17, 1946 |

FOREIGN PATENTS

| | | |
|---|---|---|
| 410,089 | Germany | Feb. 23, 1925 |